United States Patent
Layton et al.

(10) Patent No.: US 6,877,564 B2
(45) Date of Patent: Apr. 12, 2005

(54) FLAPPER CLOSURE MECHANISM

(75) Inventors: Ben C. Layton, Okmulgee, OK (US); Steve Rosenblatt, Haddonfield, NJ (US)

(73) Assignee: Baker Hughes Incorporated, Houston, TX (US)

( * ) Notice: Subject to any disclaimer, the term of this patent is extended or adjusted under 35 U.S.C. 154(b) by 24 days.

(21) Appl. No.: 10/260,596

(22) Filed: Sep. 30, 2002

(65) Prior Publication Data

US 2004/0060704 A1 Apr. 1, 2004

(51) Int. Cl.⁷ .............................................. E21B 34/06
(52) U.S. Cl. ................................................. 166/332.8
(58) Field of Search ................ 166/332.8, 321, 166/325, 316; 137/515, 515.5, 515.7, 527, 535, 536, 527.4; 251/298, 337, 336

(56) References Cited

U.S. PATENT DOCUMENTS

| | | |
|---|---|---|
| 2,798,561 A | 7/1957 | True |
| 3,482,603 A | 12/1969 | Outcalt |
| 3,817,278 A | 6/1974 | Elliott |
| 3,830,306 A * | 8/1974 | Brown ................. 166/53 |
| 3,958,633 A | 5/1976 | Britch et al. |
| 3,980,135 A | 9/1976 | Garrett |
| 4,019,532 A | 4/1977 | Schittek |
| 4,168,772 A * | 9/1979 | Eberle ................. 198/418.3 |
| 4,407,325 A | 10/1983 | Chernaik |
| 4,422,618 A | 12/1983 | Lawson |
| 4,503,913 A * | 3/1985 | Carmody ................. 166/319 |
| 4,531,587 A | 7/1985 | Fineberg |
| 4,585,026 A * | 4/1986 | Norton ................. 137/512.1 |
| 4,669,500 A | 6/1987 | Strelow |
| 4,782,895 A | 11/1988 | Jacob et al. |
| 5,137,090 A | 8/1992 | Hare et al. |
| 5,145,005 A | 9/1992 | Dollison |
| 5,156,374 A | 10/1992 | Fort et al. |
| 5,159,981 A | 11/1992 | Le |
| 5,201,371 A | 4/1993 | Allen |
| 5,310,005 A | 5/1994 | Dollison |
| 5,411,056 A | 5/1995 | Solaroli |
| 5,564,502 A | 10/1996 | Crow et al. |
| 5,794,655 A | 8/1998 | Funderburk et al. |
| 6,003,605 A | 12/1999 | Dickson et al. |
| 6,199,381 B1 * | 3/2001 | Unger et al. ................. 60/520 |
| 6,227,299 B1 | 5/2001 | Dennistoun |
| 6,253,843 B1 | 7/2001 | Rawson et al. |
| 6,269,874 B1 | 8/2001 | Rawson et al. |
| 6,328,062 B1 | 12/2001 | Williams et al. |
| 2003/0121665 A1 * | 7/2003 | Trott et al. ............... 166/332.8 |
| 2003/0178199 A1 * | 9/2003 | Deaton ..................... 166/332.8 |

FOREIGN PATENT DOCUMENTS

| | | |
|---|---|---|
| GB | 1308954 | 3/1973 |
| GB | 1563487 | 3/1980 |
| GB | 2198170 | 6/1988 |
| GB | 2236549 | 4/1991 |
| WO | WO 86/05853 | 10/1986 |

* cited by examiner

*Primary Examiner*—David Bagnell
*Assistant Examiner*—Daniel P Stephenson
(74) *Attorney, Agent, or Firm*—Steve Rosenblatt

(57) ABSTRACT

A closure mechanism for a flapper features a pinion on the ear extending from the flapper that is used to mount it for pivotal movement. A spring-loaded rack meshes with the pinion or pinions on the flapper so that when the flow tube swings the flapper open, rotation of the pinion teeth advances the teeth on the rack against the force of a spring. When the flow tube is retracted, the spring pushes the teeth on the rack in the opposite direction causing a rotational movement of the flapper toward closure in contact with a conforming seat.

17 Claims, 3 Drawing Sheets

FLAPPER CLOSURE MECHANISM

FIELD OF THE INVENTION

The field of this invention is closure mechanisms for safety valve closure members known as flappers.

BACKGROUND OF THE INVENTION

Safety valves are frequently used downhole to provide emergency closure to prevent blowouts. A common design incorporates a pressurized control system involving a control line running from the surface to the valve body downhole. Pressure on the control line moves a piston connected to a hollow tube inside the valve body, known as a flow tube. A circular seat is provided for the valve member, which has a conforming shape. The valve member, known as a flapper is mounted for 90-degree rotation. When the flow tube is advanced downhole, it contacts the flapper and pushes it off the seat. The flapper winds up behind the flow tube in the wide-open position. To close the valve, pressure is removed from the control line or other control action is taken so that the flow tube is forced in an uphole direction. Eventually the flow tube clears the flapper and a spring on the flapper urges it to rotate 90 degrees until it comes to rest in sealing contact with the conforming valve seat.

Prior designs have used a variety of torsion springs to urge the flapper to the closed position. One prior design is illustrated in FIG. 1 of U.S. Pat. No. 6,328,062. Here the torsion spring is mounted around a pin extending through a pair of parallel ears sticking out from the flapper. The torsion spring has one end fixed and the other end has a tab that contacts the flapper. When the flapper is pushed open by the flow tube, the torsion spring winds up to store a closure force to act on the flapper when the flow tube is later retracted. Other types of flappers have a single broad ear that extends from an edge and the torsion springs are connected at opposed ends of a mounting pin that rotates with the flapper. The rotation of the flapper winds up the torsion springs. This layout is shown as FIG. 2 of U.S. Pat. No. 6,328,062. The problems with both such designs were explained in detail in this patent and the invention in that patent tried to address the design weaknesses of the prior art. The problem was end failure of the torsion springs particularly in the hook or tab area that contacted the flapper or its mounting pin. The proposed solutions were to use a universal joint connection at the connection interface to reduce fatigue failures at this location or to use an alignment rod running through the curved torsion spring disposed outside the periphery of the flapper. The problem with these solutions was the difficulty in manufacturing parts to have the required strength in the limited space available and the added cost of the parts and the labor to assemble them in place.

Other flapper closure designs are illustrated in U.S. Pat. Nos.: 4,019,532; 4,407,325; 4,531,587; 5,156,374; 6,003, 605; 5,411,056 and GB Applications 1,308,954; 1,563,487; 2,198,170 and 2,236,549 and PCT Application WO86/ 05853.

What is needed and what is one of the desired objectives of the present invention is to be able to provide a simple and inexpensive closure mechanism that can be reliable in operation over the many years a safety valve is in operation downhole. The preferred solution involving a rack and pinion accomplishes this objective. Other variations are also contemplated and the full scope of the invention will be appreciated by one skilled in the art from a review of the detailed description of the preferred embodiment and the claims, which appear below.

SUMMARY OF THE INVENTION

A closure mechanism for a flapper features a pinion on the ear extending from the flapper that is used to mount it for pivotal movement. A spring-loaded rack meshes with the pinion or pinions on the flapper so that when the flow tube swings the flapper open, rotation of the pinion teeth advances the teeth on the rack against the force of a spring. When the flow tube is retracted, the spring pushes the teeth on the rack in the opposite direction causing a rotational movement of the flapper toward closure in contact with a conforming seat.

DETAILED DESCRIPTION OF THE DRAWINGS

DETAILED DESCRIPTION OF THE PREFERRED EMBODIMENT

Figure 1:
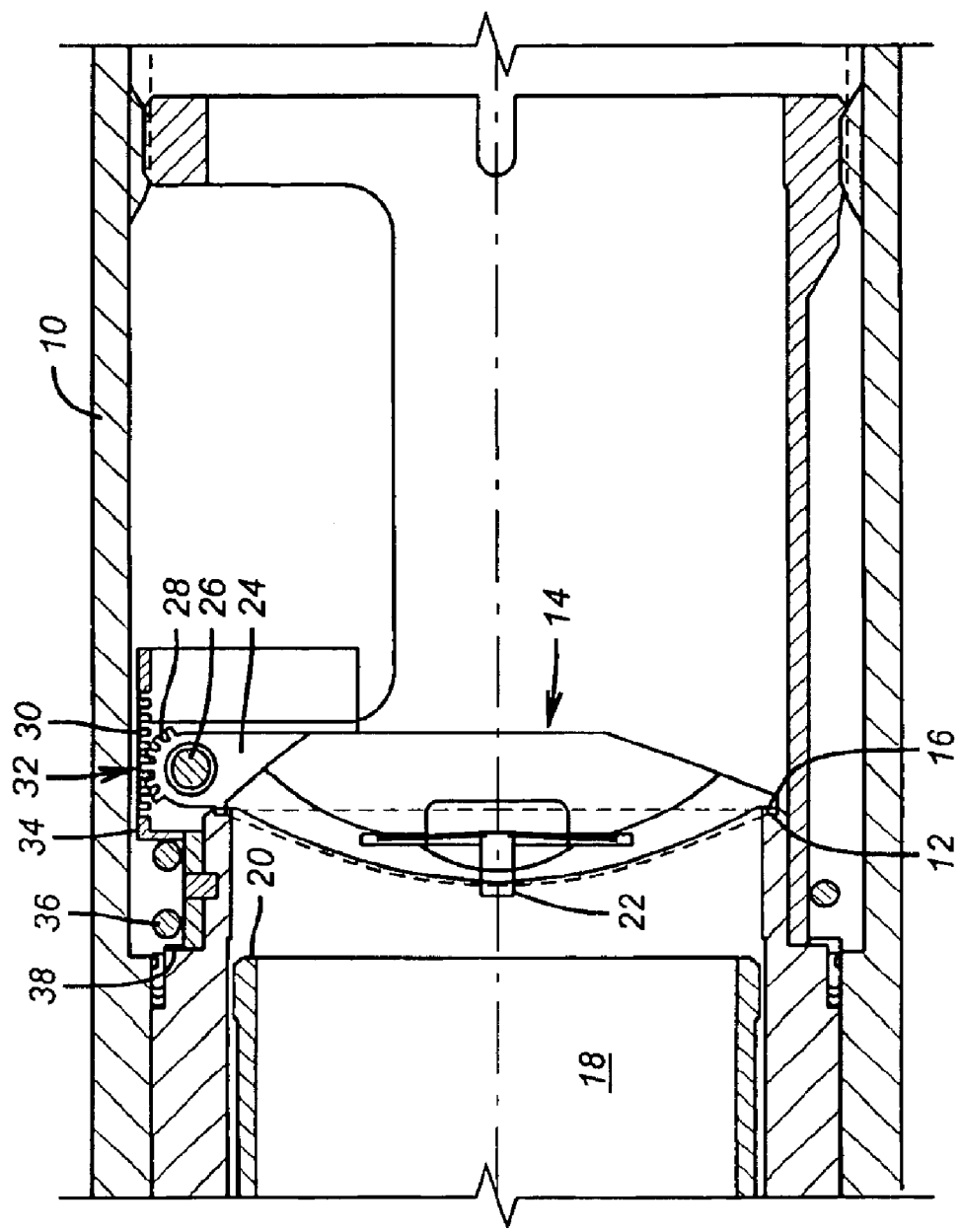
FIG. 1 is a section view through the flapper in the closed position.

FIG. 1 illustrates the relevant portion of a safety valve needed for a complete understanding of the invention by one skilled in the art. For that reason the remainder of the valve is not illustrated. The housing 10 features a stationary valve seat 12. A flapper 14 has an edge 16 that conforms to the shape of the seat 12 to define the illustrated closed position. Flow tube 18 has a lower end 20 to contact the flapper 14 as well as the pressure equalizer piston 22. The pressure equalizer feature in flapper type valves is a feature known in the art to facilitate opening the flapper 14 by initially removing pressure differentials across the flapper 14 before the flow tube 18 tries to rotate it in a 90-degree arc. Flapper 14 has one or more ears or hinge segments 24 through which extends a mounting pin 26. Pin 26 is supported by housing 10. A series of gear teeth 28 are disposed at the periphery of ears 24 for meshing contact with gear teeth 30 forming a rack 32. Rack 32 is generally L-shaped and is supported by shoulder 34 of valve seat 12. A spring 36 biases the rack 32 downwardly against shoulder 34. The upper end of spring 36 bears on stationary shoulder 38. Spring 36 can be a coiled spring or springs, one or more Belleville washers or a piston cylinder combination involving the compression of a compressible fluid to create the stored potential energy force.

Figure 2:
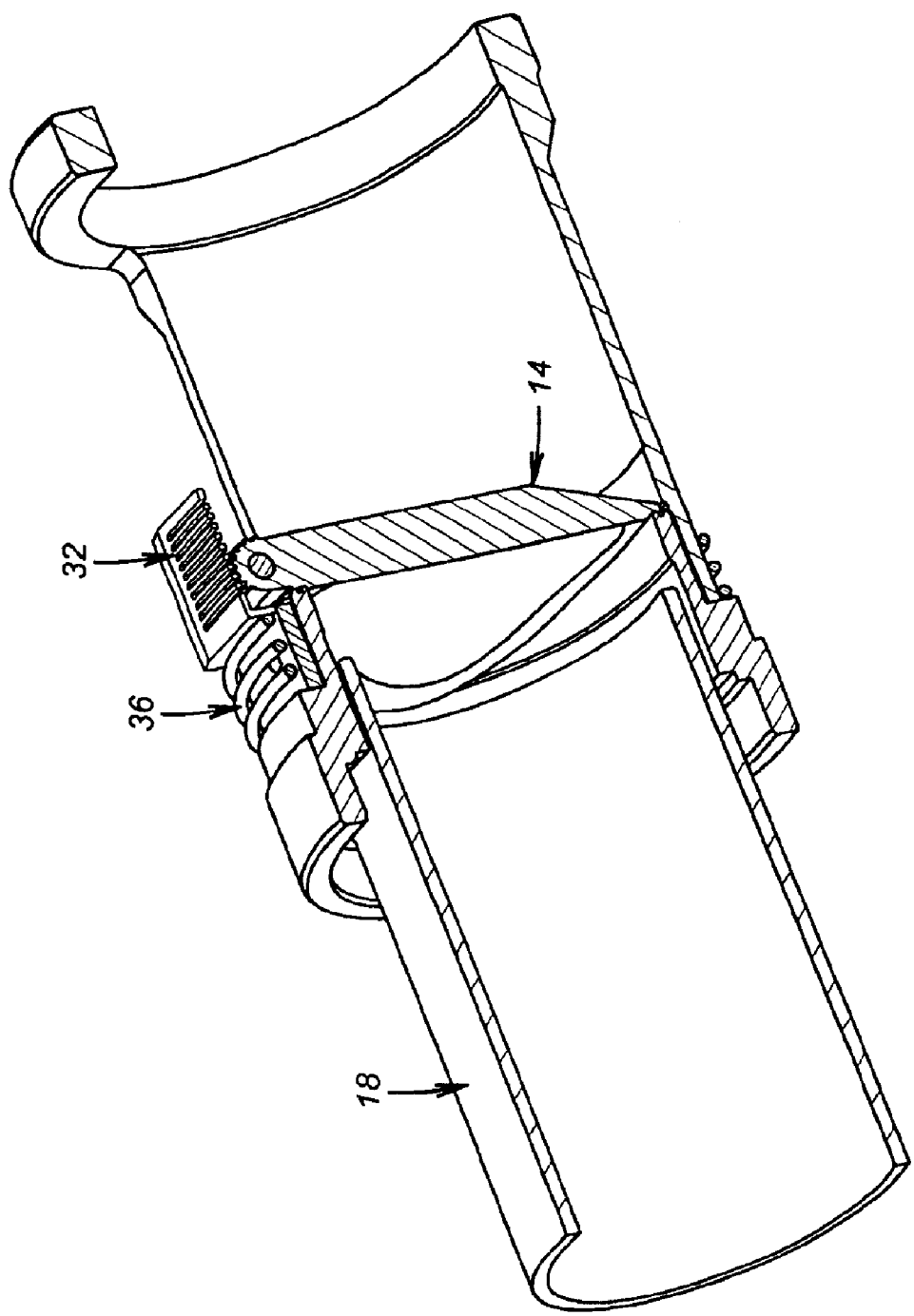
FIG. 2 is a perspective view of the flapper in the closed position.
Figure 3:
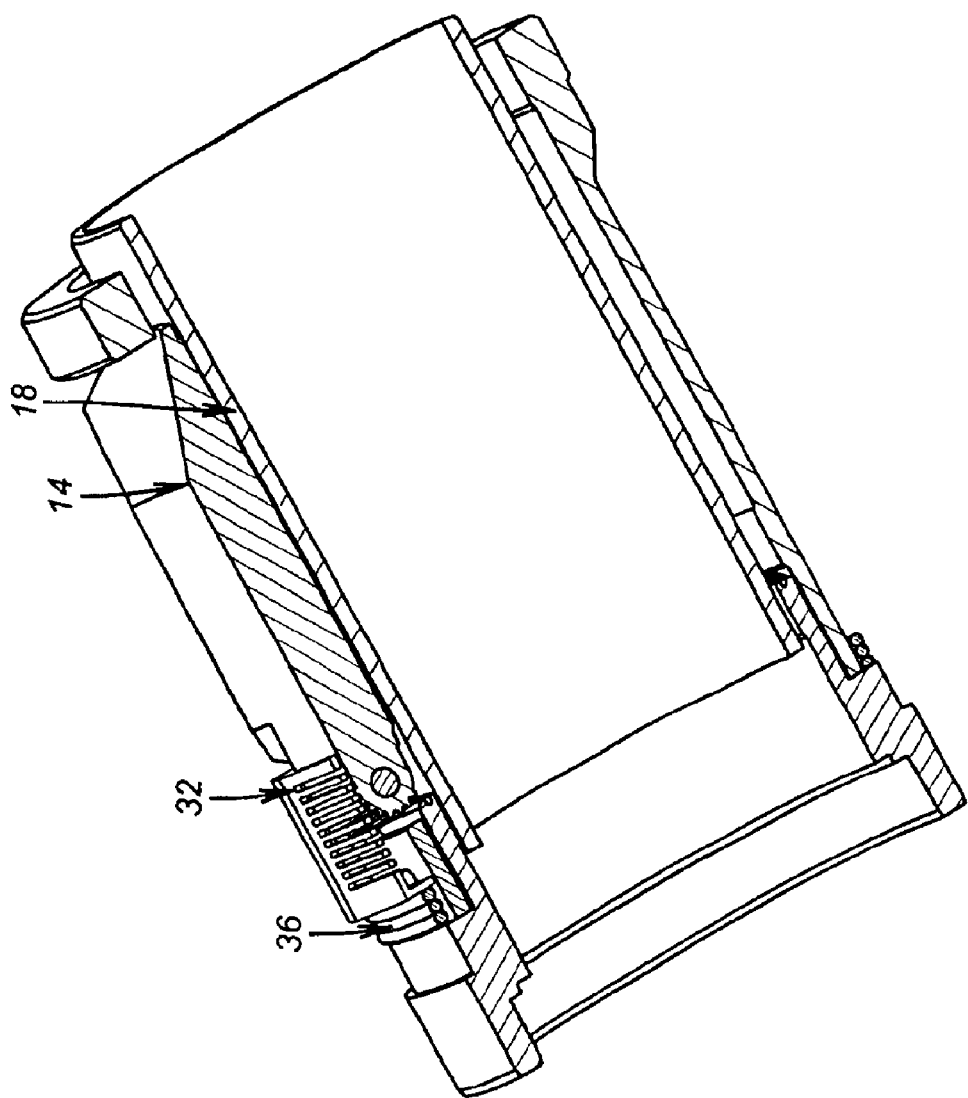
FIG. 3 is a perspective view of the flapper in the open position.

The significant parts of the preferred embodiment now having been described, its operation will be reviewed in greater detail. When the flow tube 18 is actuated to move down, it will contact the flapper 14 and start it rotating about pin 26. Gear teeth 28 will also rotate. Since gear teeth 28 are engaged to gear teeth 30 of rack 32, rack 32 will be forced up against the force of spring 36. FIG. 3 illustrates the fully open position with the flow tube 18 in front of flapper 14 so as to hold the stored force in the spring 36 after it has been compressed due to the rotation of the flapper 14 about pin 26 caused by the advance of flow tube 18. FIG. 2 is a perspective view of the closed position shown in section in FIG. 1. When the flow tube 18 is retracted away from flapper 14, the spring 36 forces down rack 32, which in turn rotates the flapper 14 due to the meshing of teeth 30 and 28.

Those skilled in the art will appreciate that using engaging teeth is but one way to replace the torsion closure springs that have been used in the past. Frictional contact between the ear 24 and a movable sleeve used instead of a rack 32 can also achieve the desired closure action. Rack 32 without teeth 30 can also engage a portion of ear 24 extending on the other side of pin 26 from the flapper 14 to effect a lever force created by spring 36 to close the flapper 14 when the flow tube 18 is retracted. A linkage can be incorporated into the design to apply a closure force to counteract the weight of flapper 14. Alternatively, the potential energy force can be created directly through contact with a portion of hinge or ear 24 extending beyond pin 26. A piston acted upon by a compressible fluid in a cylinder or any other device that will store potential energy can replace the spring 36. Opening of the flapper 14 displaces the piston to compress the compressible fluid and build a source of potential energy to subsequently force the flapper 14 to the closed position. This can be done directly or through a linkage. The gas driven piston can be used in conjunction with the rack 32 to operate as described above or in an alternative arrangement where the piston applies a direct or indirect force to ear 24 to rotate the flapper 14 to its closed position. It is intended that the portrayal of spring 36 in the Figures is to be interpreted as schematic and broad enough to encompass using a piston cylinder combination where opening of the flapper 14 displaces a piston to compress a compressible fluid to create a source of stored potential energy, and to include other systems that net the same result.

The foregoing disclosure and description of the invention are illustrative and explanatory thereof, and various changes in the size, shape and materials, as well as in the details of the illustrated construction, may be made without departing from the spirit of the invention.

We claim:

1. A safety valve assembly, comprising:

a housing having a bore therethrough;

a flapper pivotally mounted in said housing for movement between an open and a closed position;

a movable flow tube to contact said flapper to urge it toward its open position; and a closure system mounted outside said bore in said housing and not directly hydraulically operated to urge said flapper to its closed position, said closure system, without being pinned to said flapper, converting said pivotal movement of said flapper toward its open position to a linear movement of said closure system for the purpose of creating a potential energy force for subsequent movement of said flapper by said closure system to its closed position.

2. The safety valve assembly of claim 1, wherein:

said linear movement compresses at least one spring.

3. The safety valve assembly of claim 1, wherein:

said linear movement moves a piston against a compressible fluid.

4. The safety valve assembly of claim 1, wherein:

said closure system comprises a rack engaged to a pinion turned by movement of said flapper.

5. The safety valve assembly of claim 4, wherein:

the contact between said rack and pinion is by virtue of engaged teeth.

6. The safety valve assembly of claim 4, wherein:

the contact between said rack and pinion is frictional.

7. The safety valve assembly of claim 4, wherein:

said potential energy is created from movement of said rack against a spring.

8. The safety valve assembly of claim 7, wherein:

said spring comprises a coiled spring.

9. The safety valve assembly of claim 7, wherein:

said spring comprises at least one Belleville washer.

10. The safety valve assembly of claim 7, wherein:

said spring comprises a reservoir of compressible fluid.

11. The safety valve assembly of claim 10, wherein:

said rack displaces a piston into said reservoir to compress said fluid.

12. The safety valve assembly of claim 1, wherein:

said flapper comprises a hinge with a pivot pin extending through said hinge from said body, said hinge extending beyond said pin;

said closure system comprising a biasing member connected to said portion of said hinge extending beyond said pin.

13. The safety valve assembly of claim 12, wherein:

said biasing member comprises a coiled spring.

14. The safety valve assembly of claim 12, wherein:

said biasing member comprises at least one Belleville washer.

15. The safety valve assembly of claim 12, wherein:

said biasing member comprises a reservoir of compressible fluid.

16. The safety valve assembly of claim 15, wherein:

said extending portion of said hinge displaces a piston into said reservoir to compress said fluid.

17. The safety valve assembly of claim 12, wherein:

said biasing member is connected to said hinge by a linkage.

* * * * *